US007654035B2

(12) United States Patent
Guarga Ferro

(10) Patent No.: US 7,654,035 B2
(45) Date of Patent: Feb. 2, 2010

(54) DEVICE FOR THE CREATION OF CONTAINMENT BARRIERS FOR COLD AIR IN ATMOSPHERIC CONDITIONS CORRESPONDING TO RADIATION FROSTS

(76) Inventor: Rafael Guarga Ferro, Paysandu 985, Apto. 101, Montevideo (UY)

( * ) Notice: Subject to any disclaimer, the term of this patent is extended or adjusted under 35 U.S.C. 154(b) by 57 days.

(21) Appl. No.: 11/029,896

(22) Filed: Jan. 5, 2005

(65) Prior Publication Data
US 2005/0194121 A1 Sep. 8, 2005

(30) Foreign Application Priority Data
Jan. 5, 2004 (UY) .................................. 28.161

(51) Int. Cl.
A01G 13/00 (2006.01)
(52) U.S. Cl. ........................................................... 47/2
(58) Field of Classification Search ................ 47/2; 34/498; 239/2.1
See application file for complete search history.

(56) References Cited

U.S. PATENT DOCUMENTS

| 1,451,994 | A | * | 4/1923 | Mackenzie | 47/2 |
| 1,571,467 | A | * | 2/1926 | Cobb | 47/2 |
| 1,575,971 | A | * | 3/1926 | Cobb | 47/2 |
| 2,175,422 | A | * | 10/1939 | Yoshinaka | 47/2 |
| 2,615,284 | A | * | 10/1952 | Fowler, Jr. | 47/2 |
| 2,655,764 | A | * | 10/1953 | Watkins | 47/2 |
| 2,966,763 | A | * | 1/1961 | Ferrell | 47/2 |
| 3,055,145 | A | * | 9/1962 | Lindsay | 47/2 |
| 3,243,890 | A | * | 4/1966 | Easterday | 34/498 |
| 3,292,306 | A | * | 12/1966 | Carlson | 47/2 |
| 3,306,533 | A | * | 2/1967 | Vertrees et al. | 417/364 |
| 4,327,704 | A | * | 5/1982 | Fredrickson | 126/59.5 |
| 4,513,529 | A | * | 4/1985 | Reich | 47/2 |
| 4,753,034 | A | * | 6/1988 | Brown | 47/2 |
| 5,305,548 | A | * | 4/1994 | Siebol | 47/2 |
| 5,647,165 | A | * | 7/1997 | Guarga Ferro | 47/2 |
| 6,088,959 | A | * | 7/2000 | Wait et al. | 47/58.1 R |
| 6,223,995 | B1 | * | 5/2001 | Evans et al. | 239/2.1 |
| 6,257,498 | B1 | * | 7/2001 | Siebol | 239/77 |
| 2005/0194121 | A1 | * | 9/2005 | Ferro | 165/104.11 |

OTHER PUBLICATIONS

Guarga et al., Evaluation of the SIS, a New Frost Protection Method Applied in a Citrus Orchard, 2000, Proceedings of the International Society of Citriculture.*
SIS Frost Protection Corporation, Technical Papers Home, http://www.frostprotection.com; This reference puts a date on the Guarga Publication.*

* cited by examiner

Primary Examiner—Francis T Palo
(74) Attorney, Agent, or Firm—Ladas and Parry LLP

(57) ABSTRACT

A method for generating a pneumatic barrier with a device that operates in a stratified atmosphere associated with the occurrence of radiation frost. This device takes cold and dense air found close to the ground by means of an axial fan with a vertical axle that propels the air upward to an elbow that forces the airflow to make a 90° turn. The airflow discharged from the device through the outlet section forms a jet with a horizontal axis. The jet's vertical cross-section, perpendicular to its axis, has a rectangular shape and sides that grow with the distance to the outlet. The momentum transported by the jet is able to create at a certain distance from the outlet a pneumatic barrier that fits the jet's section. This pneumatic barrier faces an air mass that is colder and denser than the air transported by the jet and prevents such colder and denser air from advancing toward the device.

10 Claims, 5 Drawing Sheets

DEVICE FOR THE CREATION OF CONTAINMENT BARRIERS FOR COLD AIR IN ATMOSPHERIC CONDITIONS CORRESPONDING TO RADIATION FROSTS

TECHNICAL FIELD

The subject of this application belongs to the technical area of crop frost protection. It constitutes a device that generates pneumatic barriers at the perimeter of crop areas protected from frost occurrence by means of selective drainage of cold air. The purpose of the pneumatic barriers is to prevent surrounding cold and dense air from entering the protected area.

BACKGROUND OF THE INVENTION

The use of the selective cold air drainage as a method of crop frost protection has been increasing in the world, and in particular in the US, since the 90's due to the growing application of the Selective Inverted Drain (SID). This device is protected by U.S. Pat. No. 5,647,165, of applicants authorship.

The SID can be applied in very different ways to reduce the damage produced by the radiation frost to diverse crops. The application diversity arises mainly from the topography of the area to protect. Frequently, orchards are located on large valleys with very gentle slopes (approx. 1/1000).

During frost nights (clear and calm nights with low relative humidity), cold air accumulates in these valleys, producing damage to the crops. Cold air accumulation areas area characterized by a stable and stratified atmosphere (density decreases with height and temperature increases with height).

To protect these orchards with SIDs, it is necessary to surround the area to be protected with artificial barriers (or curtains) many meters in height. In that way the SIDs drain the cold air in the protected area and the artificial barriers (located on the perimeter of the mentioned area) prevent the coldest and densest layers from entering the area up to the height of the artificial barrier. The combined action of the selective drainage and the barrier produces a higher temperature at canopy level within the protected area compared to the same height outside the protected area.

The construction of the curtains, with heights reaching several meters, is an important practical problem in the application of SIDs. Required heights range from 1.5 m to 8.00 m, depending on different factors that are analyzed in a case by case basis.

A common way to construct the mentioned curtains is to use fast growing vegetation with a foliage thick enough to block the flux of cold air. The main problem with this alternative is the long time (many years) needed to reach the desired heights; it is a long term solution to a problem that needs to be solved in most cases within few weeks or months.

Another solution consists of constructing the curtains with light, low cost plastic materials, supported by a steel tube structure, kept in a vertical position by means of turnbuckles secured to the ground. The advantage of this constructive method is that the entire curtain can be set in few days. The main problems of this kind of curtain are: vulnerability to strong winds, visual obstruction of the natural environment, the need to obtain special permissions to set the curtain, and the obstruction the curtain may cause to the free circulation of vehicles in the orchard. Besides, these light curtains demand maintenance during the frost risk season and a continuous supervision during frost nights.

It must also be noted that, occasionally, the sole use of natural or artificial curtains, with no SID, may constitute a very effective way of protection against the damage produced by radiation frost. The strategic location of natural or artificial curtains in the protected orchard can divert the cold air currents that would otherwise invade the orchard.

The construction of barriers free from the problems associated with natural curtains and light materials artificial curtains is of great practical interest for a range of solutions to control the radiation frost that are based on the modification of the cold air circulation over the orchard.

The above arguments have highlighted the need, within the radiation frost protection field, to substitute curtains of diverse materials by pneumatic barriers able to dam the cold and dense air away from the protected area. This need has been amplified by the increasing application of the device protected under U.S. Pat. No. 5,647,165.

SUMMARY OF THE INVENTION

The subject of the current patent application is a device that accomplishes the function of containing the cold air flux, the same way a material barrier does, but using cold air motion. The device captures the coldest air, which is near to the ground in the protected area and expels it, in the form of a jet, towards the cold air mass to be contained. This jet has a horizontal axis and its dynamical characteristics (geometry and velocity field) will generate the momentum flux required to balance the force exerted by the cold air mass to be contained. Such dynamic characteristics are determined by the geometry of the device outlet structure and by the flow rate the device puts in motion. The kinetic energy acquired by the cold air since it is captured by the device until it is expelled in the jet, is proportioned by a fan located in the interior of the device.

The referred device performs three functions. The first one is the intake of the airflow that is put in motion. Such intake must be carried out minimizing the localized loss of head, and also within a small distance from the ground in order to maximize the average density of the captured air. The second is to propel the above mentioned flow transferring mechanical power to the fluid. The third one is the discharge of air to the atmosphere minimizing the localized loss of head and allowing the conformation of a jet with an approximately horizontal axis. The structure of the jet will arise from the geometric design of the outlet structure, vertical depth and angle between lateral boundaries. These geometric parameters, together with the flow rate, will determine the height and width of the desired pneumatic barrier, so as to fulfill the function of preventing the coldest layers that surround the perimeter of the protected area from flooding the protected crops.

BRIEF DESCRIPTION OF THE DRAWINGS

In order to facilitate the description made, the following figures are attached with sketches of selected examples with the following general references in addition to the specific ones already used in the description.

DETAILED DESCRIPTION OF THE SPECIFIC EMBODIMENTS

Figure 1:
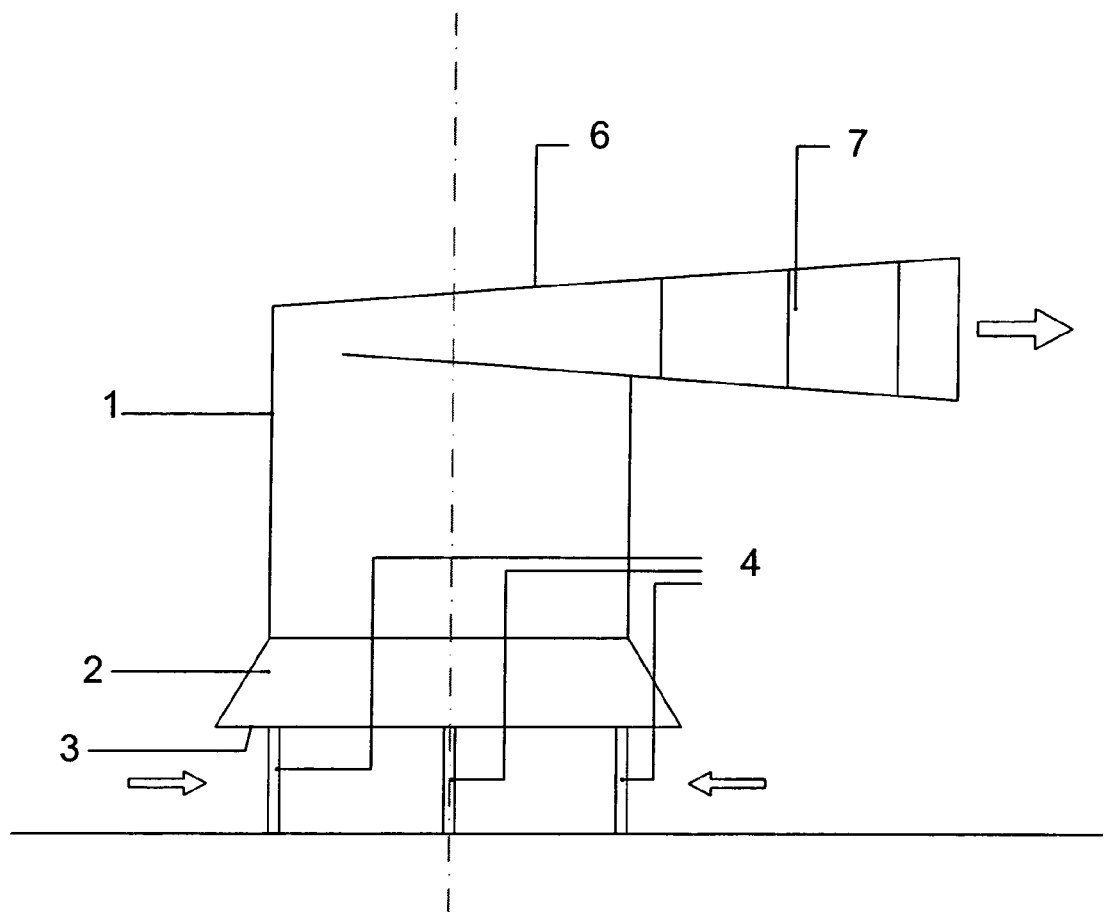
FIG. 1 Elevation of the device presented under the claimed invention
Figure 2:
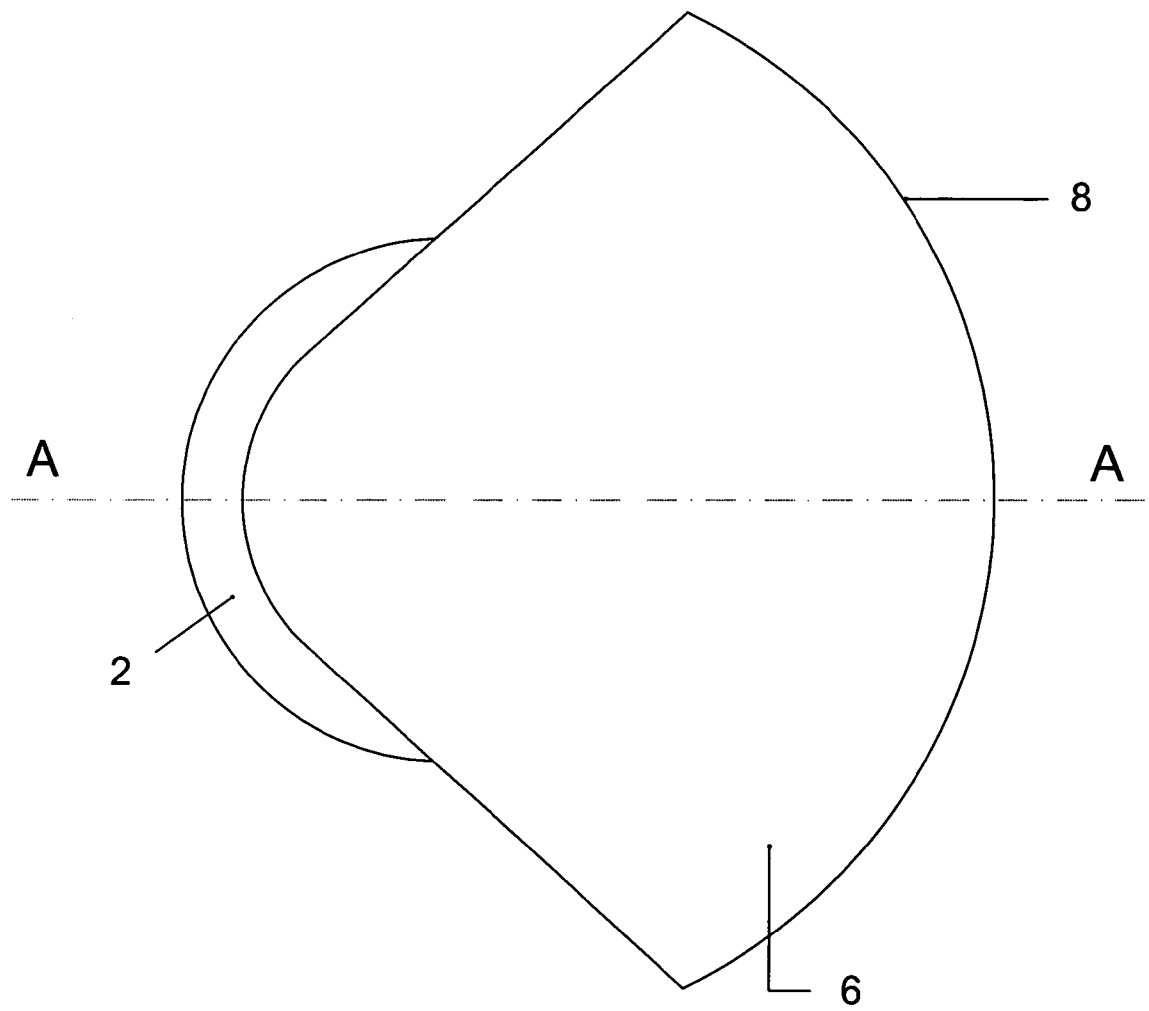
FIG. 2 Top view of the device presented under the claimed invention
Figure 3:
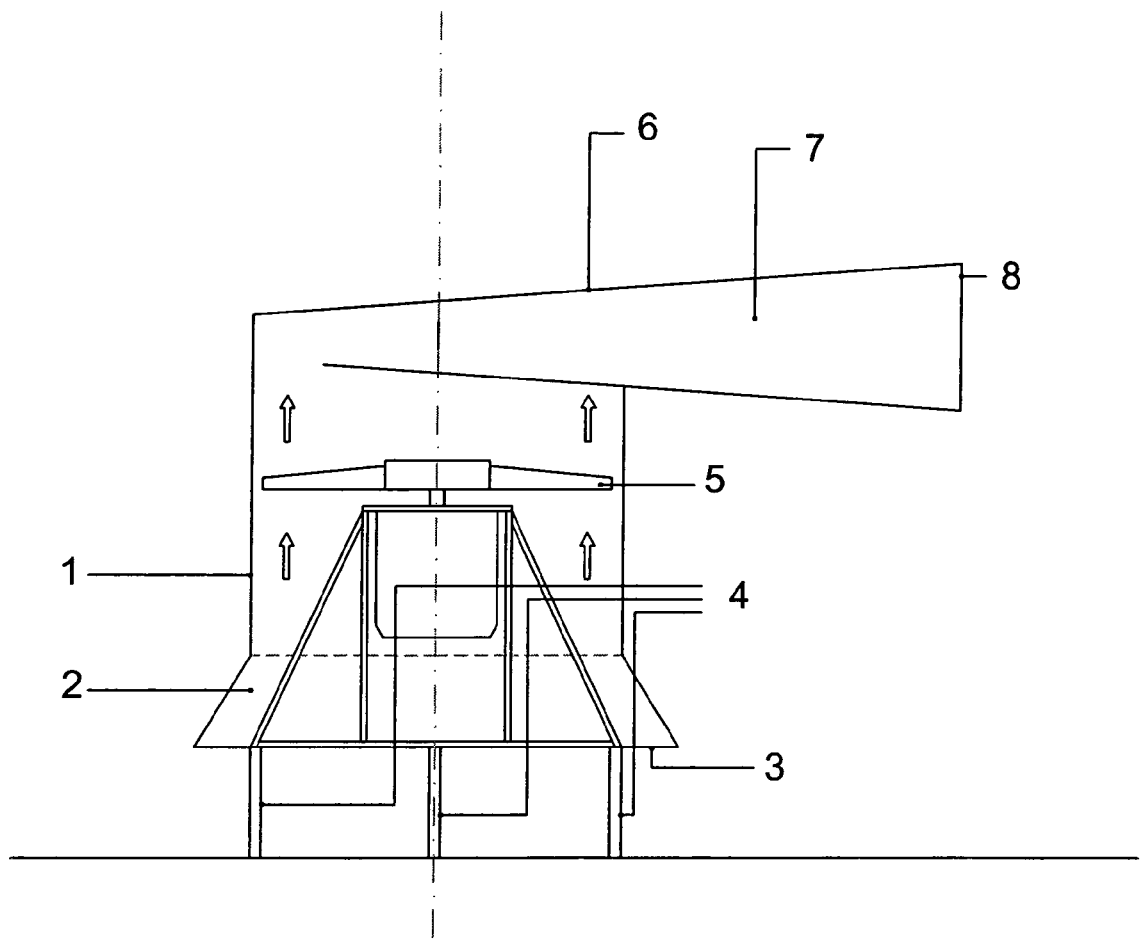
FIG. 3 Vertical section through the axis of the device presented under the claimed invention FIG. 4 Elevation of the device, the jet expelled by the device and the pneumatic barrier that separates the protected area from the exterior FIG. 5 Top view of the device, the jet expelled by the device and fractions of the jets from the neighboring devices, and the pneumatic barrier that separates the protected area from the exterior. This barrier results from the combined effect of the jets.

FIGS. 1, 2 and 3 show sketches of the device in elevation, top view and section.

The intake of the airflow is made through a hollow cylindrical structure, with a circular or regular polygonal section and a vertical axis (1). The air circulation occurs from bottom to top. The cylindrical structure (1) connects with a conical flared structure (2) in its flat lowermost section (closest to the ground). The axis of the conical structure (2) coincides with the axis of the already mentioned cylindrical structure (1). The section of the above mentioned conical structure (2) increases downward (larger section when approaching the ground). The conical structure (2) ends (at the rim closest to the ground) in a flat and open section (3), perpendicular to the cone axis through which the air enters to the device. The section (3) is spaced above the ground a distance that can vary according to the flow rate of the device. This variation is achieved adjusting the height of the legs (4) that support the device on the ground.

The flow is propelled by means of a standard fan (5) whose characteristics with regard to its kind, diameter, flow rate and static head will be the adequate to the desired jet shape.

The discharge occurs through an outlet structure (6) which takes the outflow from the fan and introduces it in various stream tubes (7) that direct the flow to an outlet section (8) that in turn distributes it uniformly in accordance with a circular sector (from top view) with an angle to the center not less than 60° and not greater than 180°. The velocity at the outlet section (8) will be approximately horizontal and the average magnitude is large enough to prevent the coldest layers (which surround the perimeter of the area) from entering the interior of the protected area.

Figure 4:
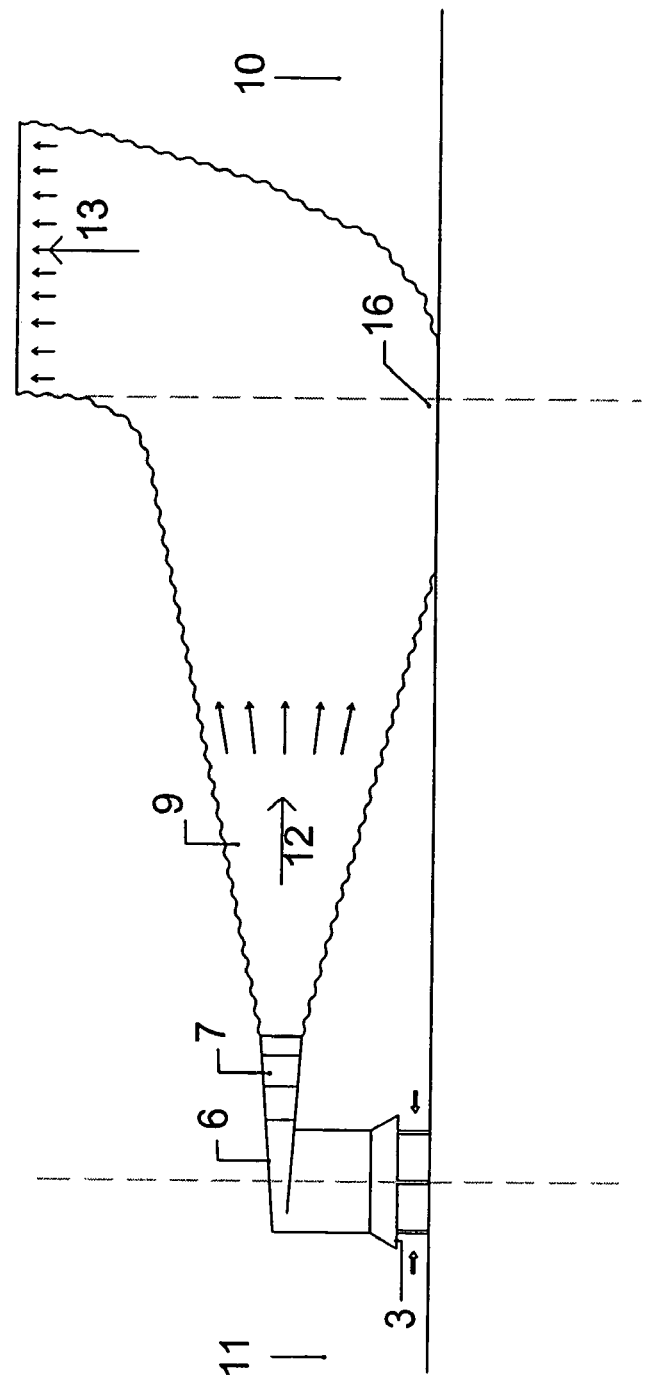
Figure 5:
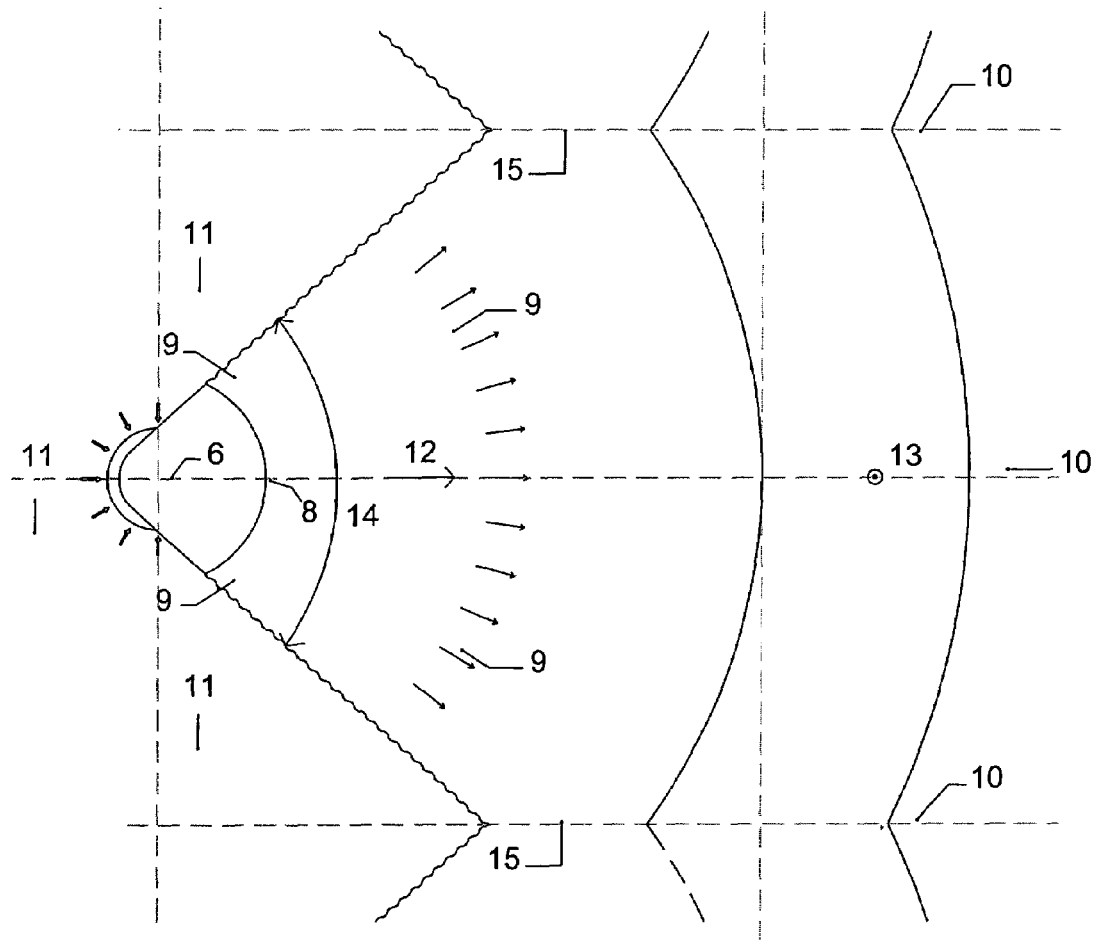

FIGS. 4 and 5 illustrate, in elevation and top view respectively, the action of the jet on the cold air mass outside the protected area.

The action of the above mention device on the lower atmospheric layers, where the crops are submerged, has a protective impact on the crops that is twofold. First, it drains the cold and dense air within the protected area (11) through the inlet section at the bottom of the device (3). This air is expelled through the outlet section (8) as a jet (9) whose mean velocity (12) is horizontal. The jet advances horizontally until it acquires ascending velocity (13) due to its buoyancy. Second, and of decisive importance in relation to the described device, the configuration of the jet generates the formation of a pneumatic barrier. This barrier prevents the cold air (10) that surrounds the protected area (11) from entering the latter. This pneumatic barrier that surrounds the protected area consists of the collective effect of the jets (9) expelled by the devices located in the perimeter of the protected area (11). Each jet presents, from top view, an angular configuration (14). The jets overlap laterally (15) and prevent the external coldest air (10) from penetrating the barrier. The jets also make contact with the ground (16) to avoid the external coldest air (10) from spilling into the protected area underneath the jets.

The invention claimed is:

1. A method for protecting crops in a first area of a stratified atmosphere from cold air in a surrounding area of the stratified atmosphere, the stratified atmosphere comprising a plurality of strata each of which has air of a different temperature with air in a stratum closest to the ground being coldest, the method comprising generating a pneumatic barrier to protect the crops
    (a) providing at least a first device for generating a pneumatic barrier in a stratified atmosphere to protect crops in a first area from cold air in a surrounding area, the stratified atmosphere comprising a plurality of strata each of which has air of a different temperature, the device comprising:
    a first structure comprising
        (i) a cylindrical portion with a circular or regular polygonal section, a lowermost rim and a vertical axis;
        (ii) a flared conic segment at the lowermost rim of the cylindrical portion and having a vertical axis that is the same as the vertical axis of the cylindrical portion, the conic segment flaring outwardly from the lowermost rim and ending in a flat, horizontal and open section;
        (iii) fan means disposed in the cylindrical portion for draining air from the stratified atmosphere through the open section and lowermost rim and for producing an outflow of air in an upward direction away from the lowermost rim and from the fan means; and
        (iv) outlet structure means disposed above the fan means for taking the upward outflow of air from the fan means and ejecting it from an outlet in the first structure with a mean velocity in an approximately horizontal direction to form a jet that has a horizontal plane of symmetry and a cross section that expands as it travels away from the outlet, contacts the ground and forms the pneumatic barrier to prevent cold air from the surrounding area from entering into the first area; and
        (v) support means for supporting the first structure on the ground in the first area with the open section of the flared conic section spaced above the ground a distance that causes the fan means selectively to drain into the first structure air from the stratified atmosphere that is coldest and
    (b) supporting the first structure of the device on the ground in the first area with the open section of the flared conic section spaced above the ground a distance that allows the fan means selectively to drain into the first structure air from the stratified atmosphere that is coldest; and
    (c) causing the fan means to drain the coldest air from the stratified atmosphere through the open section and lowermost rim and to produce an outflow of cold air in an upward direction away from the lowermost rim and through the outlet portion to form a first jet of cold air that has a horizontal plane of symmetry and a cross section that expands as it travels away from the outlet, contacts the ground at a boundary between the first area and a surrounding area and forms the pneumatic barrier at the boundary to prevent cold air from the surrounding area from entering into the first area.

2. The method of claim 1, wherein the support means are adjustable to vary a height that the first structure is supported above the ground.

3. The method of claim 1, wherein the support means comprise a plurality of legs, each of the plurality of legs having a height that is less than a diameter of the flat, horizontal open section of the flared conic section.

4. The method of claim 1, wherein a geometry of a design of the device and a flow rate of air through the device are such as to form the pneumatic barrier from the ground to a height of 1.5 to 8 meters above the ground.

5. The method of claim 4, further comprising providing second and third devices comprising the first structure and the support means, and supporting the first structure of each of the second and third devices on the ground in the first area with the open section of the flared conic section of each of the second and third devices spaced above the ground a distance that allows the fan means of the respective second and third devices selectively to drain into the first structure of the respective second and third devices air from the stratified atmosphere that is coldest, and causing the fan means of each of the second and third devices to drain the coldest air from the stratified atmosphere through the open section and lowermost rim of the respective second and third devices and to produce an outflow of air in an upward direction away from the lowermost rim of the respective second and third devices and through the outlet portion of the respective second and third devices to form a second and third jets each of which has a horizontal plane of symmetry and a cross section that expands as it travels away from the outlet, and contacts the ground at the boundary, wherein the pneumatic barrier to prevent cold air from the surrounding area from entering into the first area results from a combined effect of the first, second and third jets.

6. The method of claim 5, wherein the method consists of steps (a), (b) and (c) whereby the pneumatic barrier is formed with cold air.

7. The method of claim 1, wherein the outlet structure means forms the jet with a circular sector when viewed from above, said circular sector having a central angle of between 60° and 180°.

8. The method of claim 1, wherein the fan means comprises a fan with a propeller that rotates in a horizontal plane to propel air vertically upward from the fan to the outlet structure means.

9. The method of claim 8, wherein the outlet structure means comprises an outlet structure with a first portion disposed directly above the cylindrical portion and a second portion which protrudes from the device in a horizontal direction, the outlet structure having a cross section in the shape of a portion of a cone which tapers from the second portion to the first portion.

10. The method of claim 1, wherein the method consists of steps (a), (b) and (c) whereby the pneumatic barrier is formed with cold air.

* * * * *